R. F. COOKE.
ELECTRICAL COTTON PICKING MACHINE.
No. 103,986. Patented June 7, 1870.
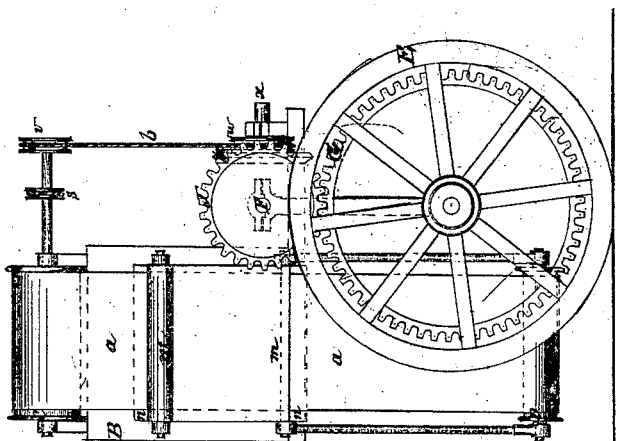
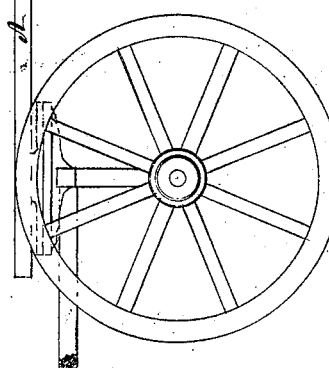
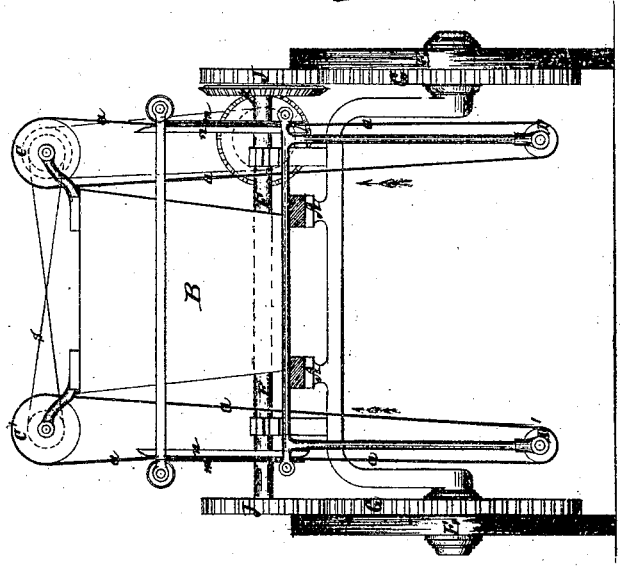
Witnesses
Henry E. Roeder
John Christ
Inventor
Robert F. Cooke

United States Patent Office.

ROBERT F. COOKE, OF BROOKLYN, NEW YORK.

Letters Patent No. 103,986, dated June 7, 1870.

IMPROVEMENT IN ELECTRICAL COTTON-PICKING MACHINES.

The Schedule referred to in these Letters Patent and making part of the same

To all whom it may concern:

Be it known that I, ROBERT F. COOKE, of Brooklyn, in the county of Kings, in the State of New York, have invented a new and useful Improvement in "Machines for Picking Cotton," of which the following is a specification.

This invention is an improvement on the machines for picking cotton for which Letters Patent of the United States have been granted to me on the 26th day of May, 1868, and on the 29th day of March, 1870, and consists in the arrangement and application of belts or bands at each side of the machine, charged with electricity, for the purpose of attracting and collecting the loosened fibers of the cotton-bolls, and carrying the same into a receiving-box.

In the accompanying drawing—

Figure I is a front view of a machine embodying my invention, and

Figure II is a side elevation of the same.

A represents the frame of the carriage or wagon to which the various shaking devices, for operating against the cotton-plant, for the purpose of loosening the cotton from the bolls, as described in my former patents, together with the necessary machinery, are attached, all of which have been left out in the accompanying drawing.

To this frame A a receiving-box, B, is attached, on each side of which endless bands or belts $a\ a$ are arranged, passing over suitable rollers, C C', situated some little distance above the box B, and over rollers D D', near the bottom of the machine, and only a short distance from the ground.

The shaft of the roller C is provided with a pulley, $r$, connected, through the belt $b$, with the pulley, $w$, on the shaft $x$, which said shaft is connected, through the gearing $p\ p$, with the shaft F, communicating thereby the desired motion to the roller C.

The shaft F has a pinion, J, on each end, meshing into the wheels G, attached to the sides of the after-wheels E of the carriage, and receives thus its motion from said after-wheels.

The roller C' is connected with the roller C by means of a belt, S, to receive the desired motion.

$n$ and $m$ are two cushions, rubbers, or electrics, between which the outer part of the belt $a$ is made to pass. These cushions or electrics are supported by suitable arms fast on the box B, or attached to the frame of the wagon, and so arranged that said electrics $n$ and $m$ may be brought nearer together, or further apart, for the purpose of increasing or diminishing the friction upon the belt $a$.

The two rubbers or electrics $n$ and $m$ are connected by a copper wire, (not shown in the drawing,) which is continued to the ground, or rests against the tire of one wheel of the machine, and whereby the supply of electricity is kept up.

The belts $a\ a$ are made of raw or unbleached silk and woolen cloth, the silk being on the outside, next to the cotton-plant, and the wool next the rollers C and D. These belts or bands may be likewise made of various other materials, such as raw silk, varnished, or of sulphur-gum rubber between raw silk, or of sulphur-gum rubber alone, or vulcanized rubber.

The rubbers or electrics may be made of any of the known and suitable materials; but I prefer to make them of vulcanized or hard rubber, and of gum or soft rubber.

$n$ is the hard or vulcanized rubber, and $m$, the soft rubber, the hard rubber being placed on the inside of the belt $a$, and the soft-rubber electric $m$ on the outside; and, when the belt $a$ is made of silk and wool, the latter material must be placed next the rollers C and D, so that the said woolen part of the belt will rest against the hard-rubber electric $n$.

The bottom rollers D D' must be made of or covered with vulcanized or hard rubber.

The top rollers C C' may be covered either with vulcanized rubber or serge.

The brackets or arms supporting the rollers C C' and D D', as well as those to which the rubbers or electrics $n$ and $m$ are fastened, must be properly insulated by covering or making them of vulcanized rubber; and the journals of the rollers may run in glass boxes, and the connecting points of the rubber may be glass when rubber is not used, or both may be employed.

The whole machine is to be made non-conducting by coating its parts with some good non-conducting material, such as hard or vulcanized rubber, shellac, copal, or amber-varnish, or any other non-conducting substance, so as not to convey the electricity from the bands or belts when electrified.

By the forward motion of the machine or wagon, the bands $a\ a$ will be operated in the direction indicated by the arrows, and pass between the electrics $n$ and $m$, and charged thereby with electricity. The cotton-plants, knocked or shaken by suitable machinery, whereby the cotton will become loosened from the bolls, pass between those electrified bands or belts $a\ a$, attracting the cotton from the bolls to their surfaces, and carry the same upward above the receiving-box B, where the cotton will be repelled, and fall into said box. Brushes or scrapers may likewise be applied to the top end of the bands or belts, for the purpose of detaching the cotton from the same.

Instead of bands or belts, stationary plates or surfaces of suitable material may be arranged on each side of the machine, between which the cotton-plant is made to pass, and which may be charged with frictional electricity, to attract the cotton from their bolls, brushes or scrapers being in that case arranged to pass over the surfaces of said plates, to collect the cotton, and carry the same into the receiving-box.

When the electricity with which the belts or bands are charged is very powerful, the cotton may be drawn from the bolls without any previous knocking or shaking of the plant.

I do not wish to confine myself to any particular arrangement or device for generating frictional electricity, as the same may be produced in various well-known ways; but

What I claim as my invention, and desire to secure by Letters Patent, is—

1. The cotton-picker, constructed so as to be charged with electricity, and thereby attract the cotton-fibers, and draw them from the bolls, substantially as and for the purpose herein specified.

2. The arrangement and use of belts or bands charged with frictional electricity, between which the cotton-plants are made to pass, for the purpose of attracting and collecting the cotton from the bolls, and convey the same to the receiving-box, substantially as hereinbefore specified.

3. The arrangement and use of suitable belts at each side of machines constructed with a device for shaking the plant, for the purpose of loosening the cotton from the bolls, in combination with suitable rubbers or electrics to charge said belts with electricity, in the manner and for the purpose substantially as herein set forth.

ROBERT F. COOKE.

Witnesses:
HENRY E. ROEDER.
JOHN CHRIST.